(12) United States Patent
Lee et al.

(10) Patent No.: US 12,467,599 B2
(45) Date of Patent: Nov. 11, 2025

(54) LAMP FOR VEHICLES

(71) Applicant: HYUNDAI MOBIS CO., LTD., Seoul (KR)

(72) Inventors: Hyun Hwa Lee, Yongin-si (KR); Jong Eun Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/980,403

(22) Filed: Dec. 13, 2024

(65) Prior Publication Data
US 2025/0334244 A1    Oct. 30, 2025

(30) Foreign Application Priority Data
Apr. 29, 2024    (KR) .......................... 10-2024-0056950

(51) Int. Cl.
*F21S 41/275*    (2018.01)

(52) U.S. Cl.
CPC .................................. *F21S 41/275* (2018.01)

(58) Field of Classification Search
CPC .................................................... F21S 41/275
See application file for complete search history.

(56) References Cited

U.S. PATENT DOCUMENTS

2022/0107068 A1\* 4/2022 Lim ................... G02B 19/0014

\* cited by examiner

*Primary Examiner* — Sean P Gramling
(74) *Attorney, Agent, or Firm* — Novo TechIP International PLLC

(57) ABSTRACT

Disclosed is a lamp for vehicles, which includes a light source, a reflector configured to reflect light incident from the light source, an optical system including a lens configured to condense the light reflected from the reflector to form a light distribution, the lens having a plurality of facets formed on a light-emitting surface thereof, wherein a line connecting centers of the plurality of facets forms a straight line or a curved line that is not perpendicular to an optical axis of the optical system or is asymmetrical with respect to the optical axis, and light from the light-emitting surface is incident on an outer lens of the lamp.

8 Claims, 7 Drawing Sheets

(a)

(b)

(a)

(b)

(a)

(b)

(a)

(b)

(a)

(b)

LAMP FOR VEHICLES

CROSS-REFERENCE TO RELATED APPLICATIONS

This application claims the benefit of Korean Patent Application No. 10-2024-0056950, filed on Apr. 29, 2024, which is hereby incorporated by reference as if fully set forth herein.

TECHNICAL FIELD

The present disclosure relates to a lamp for vehicles, and more particularly to a lamp for vehicles including a lens having a plurality of facets.

BACKGROUND

There is a need for a lamp for vehicles, particularly a headlamp, to be designed such that an optical system includes a specific skin angle. This is mainly for the design of the exterior of the vehicle, but also for cost reduction and miniaturization of the optical system.

In general, if the optical system has a specific skin angle, at least two lenses are required to avoid changing the optical axis. However, this increases the size of the optical system and increases the cost.

Therefore, when the optical system of the lamp for vehicles is designed to have a specific skin angle, there is a need for a method of miniaturizing the optical system and reducing the number of components to reduce the cost thereof.

SUMMARY

The present disclosure is to address at least the above-mentioned problems and/or disadvantages and to provide at least the advantages described below. Accordingly, an object of the present disclosure is to provide an optical system having a skin angle while having a single lens that can be applied to a lamp for vehicles.

Objects of the present disclosure are not limited to the aforementioned object, and other unmentioned objects will be clearly understood by a person having ordinary skill in the art to which the present disclosure pertains based on the following description.

In an aspect, a lamp for vehicles is provided, wherein the lamp includes a light source, a reflector configured to reflect light incident from the light source, and an optical system including a lens configured to condense the light reflected from the reflector to form light distribution, the lens having a plurality of facets formed on a light-emitting surface thereof, wherein the line connecting centers of the plurality of facets forms a straight line or a curved line that is not perpendicular to an optical axis of the optical system or is asymmetrical with respect to the optical axis, and a light emitted from the light-emitting surface is incident on an outer lens of the lamp.

Additionally or alternatively, curvatures of the plurality of facets may be formed such that the focus of the light-emitting surface is located on the optical axis of the optical system.

Additionally or alternatively, the plurality of facets may be disposed in an array extending in a horizontal direction and a vertical direction.

Additionally or alternatively, light-emitting surfaces of the facets disposed side by side in the horizontal direction, among the plurality of facets, may be formed to have horizontal slopes having a predetermined difference in inclination angle or to have curvatures having a predetermined difference in curvature, and the predetermined difference in inclination angle or the predetermined difference in curvature may be set according to an angle formed by the line connecting centers of the plurality of facets disposed side by side in the horizontal direction and the optical axis of the optical system.

Additionally or alternatively, light-emitting surfaces of the facets disposed side by side in the vertical direction, among the plurality of facets, may be formed to have vertical slopes having a predetermined difference in inclination angle or to have curvatures having a predetermined difference in curvature, and the predetermined difference in inclination angle or the predetermined difference in curvature may be set according to an angle formed by the line connecting centers of the plurality of facets disposed side by side in the vertical direction and the optical axis of the optical system.

Additionally or alternatively, each of the plurality of facets may be formed such that the curvature in the vertical direction and the curvature in the horizontal direction are the same.

Additionally or alternatively, each of the plurality of facets may have a curvature of zero.

Additionally or alternatively, a light-incident surface of the lens may condense the light reflected from the reflector.

Additionally or alternatively, the light-emitting surface of the lens may have the same skin angle as the outer lens.

In another aspect, a vehicle including the lamp for vehicles is provided.

The solving means of the present disclosure are some embodiments of the present disclosure. Various solving means other than the above solving means may be derived and understood based on the detailed description of the present disclosure, which will be given below.

BRIEF DESCRIPTION OF THE DRAWINGS

The accompanying drawings, which are included to provide a further understanding of the present disclosure and are incorporated in and constitute a part of this application, show embodiment(s) of the present disclosure and together with the description serve to explain the principle of the present disclosure. In the drawings.

DETAILED DESCRIPTION

Figure 1:
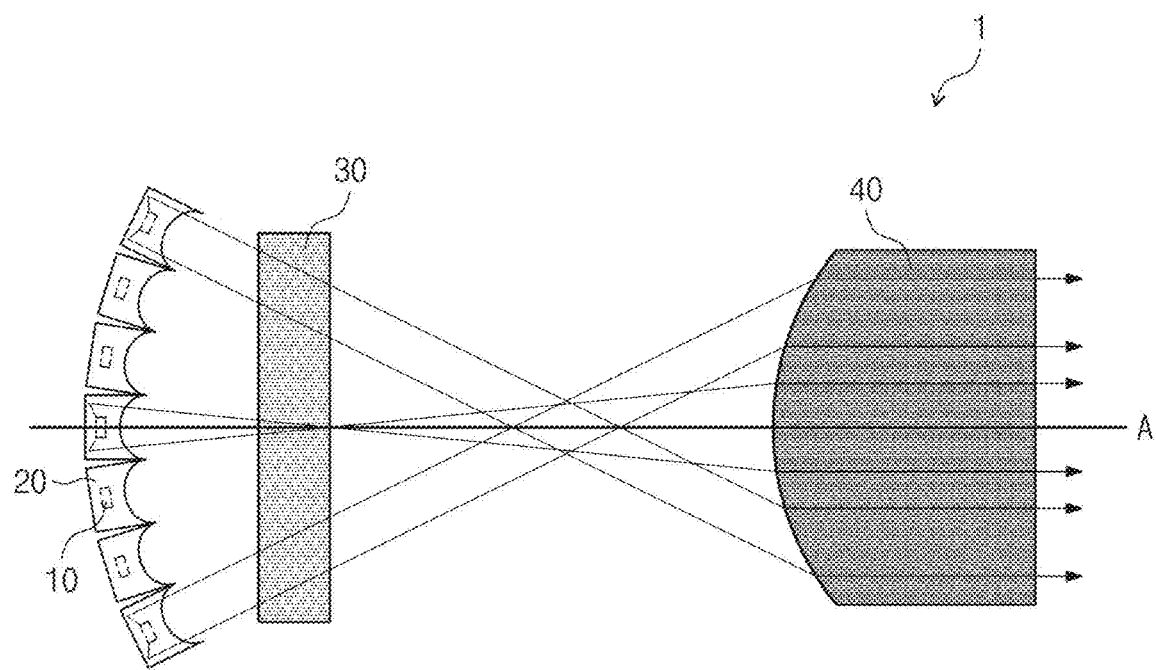
FIG. 1 shows a basic configuration of a lamp for vehicles.

Hereinafter, embodiments of the present disclosure will be described in detail with reference to the accompanying drawings.

The present disclosure below may be achieved in various different forms and is not limited to the embodiments described herein. In the drawings, parts that are not related to a description of the present disclosure are omitted to clearly explain the present disclosure and similar reference numbers will be used throughout this specification to refer to similar parts.

In the specification, when a part "includes" an element, it means that the part may further include another element rather than excluding another element unless otherwise mentioned.

FIG. 1 shows a basic configuration of an optical system 1 of a lamp for vehicles.

The lamp for vehicles may include a light source 10, a reflector 20, a shield 30, and a lens 40. The light source 10 radiates light toward the reflector 20, which reflects the incident light, and the reflected light passes through the shield 30 and is incident on the lens 40. The shield 30 is configured to control and regulate the direction of the light, and the shield 30 ensures that the light from the lamp is focused in a specific direction or, conversely, that the light is not scattered in a specific direction. The light incident on the lens 40 is refracted at a light-incident surface of the lens to form a final target light distribution.

The reflector 20 located on an optical axis A, forms a hot zone area of the light distribution, the reflector 20 located far from the optical axis forms a wide zone of the light distribution, and the reflector 20 located in the middle forms a middle zone of the light distribution.

Figure 2:
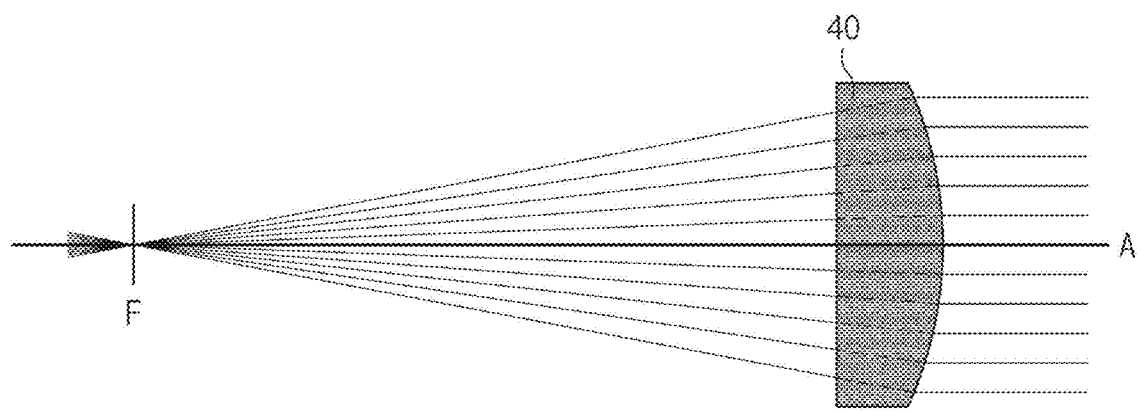
FIG. 2 shows a variation of an optical axis according to the shape of a light-emitting surface of a lens of the lamp for vehicles.
Figure 2:
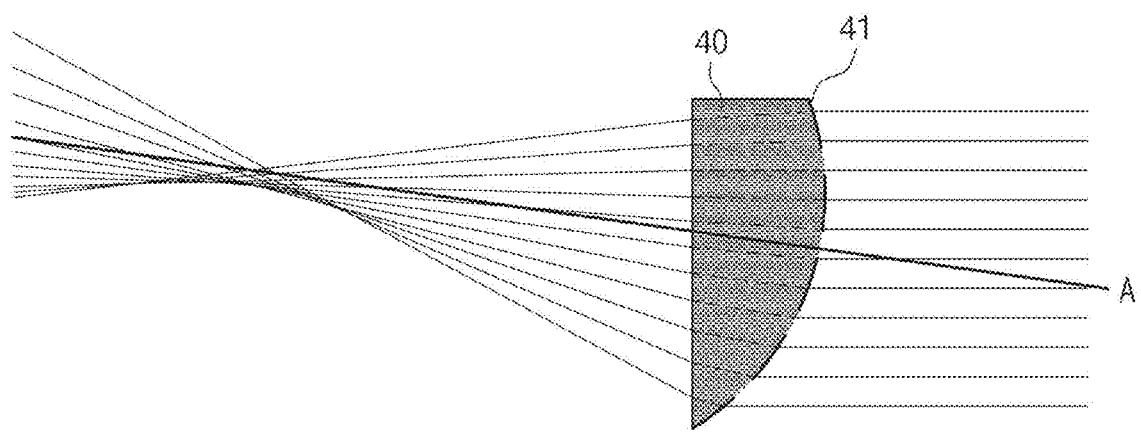

FIG. 2 shows a variation of the optical axis according to the shape of a light-emitting surface of the lens constituting the optical system of the lamp for vehicles.

A skin angle refers to the angle formed by an axis perpendicular to the direction of travel of a vehicle having a lamp or a widthwise axis of the vehicle (that is, a transverse axis) and the surface of an outer lens constituting a (head) lamp (e.g., a light-emitting surface). The light-emitting surface of the lens of the lamp optical system may be formed correspondingly or identically to the light-emitting surface of the outer lens, in which case, by extension, the skin angle of any lens of the optical system of the lamp may mean the angle formed by the light-emitting surface of the lens and the transverse axis of the vehicle or the optical axis of the optical system.

In this case, the transverse axis of the vehicle may be perpendicular to the optical axis of the optical system of the lamp, or the longitudinal axis of the vehicle may be parallel to the optical axis of the optical system of the lamp.

In FIG. 2, (a) shows a lens 40 having a different skin angle from the outer lens formed on the light-emitting surface of the optical system of the lamp. The lens shown in (a) of FIG. 2 is assumed to be a final optical member of the optical system of the lamp. That is, light transmitted through the lens 40 shown in (a) of FIG. 2 is incident on the outer lens of the lamp for vehicles without passing through any other lens or optical system.

The incident light passing through the focus F of the lens 40 is refracted on the light-incident surface of the lens 40 and refracted again at the light-emitting surface to form light emission parallel to the optical axis A.

In FIG. 2, (b) shows a lens 40 having a light-emitting surface 41 having the same (or identical) skin angle as the outer lens formed on the light-emitting surface of the optical system of the lamp. When the skin angle is formed on the light-emitting surface 41, the optical axis A changes. The optical axis may be described as distorted relative to the optical axis in (a) of FIG. 2. The lens in (b) of FIG. 2 is also assumed to be a final optical member of the optical system of the lamp. That is, light transmitted through the lens 40 in (b) of FIG. 2 is incident on the outer lens of the lamp for vehicles without passing through any other lens or optical system.

If the optical axis changes, the characteristics of the optical system will also change, and the optical system will need to be redesigned to form the light distribution expected at the time of design. Therefore, a method of maintaining the optical axis is required.

Figure 3:
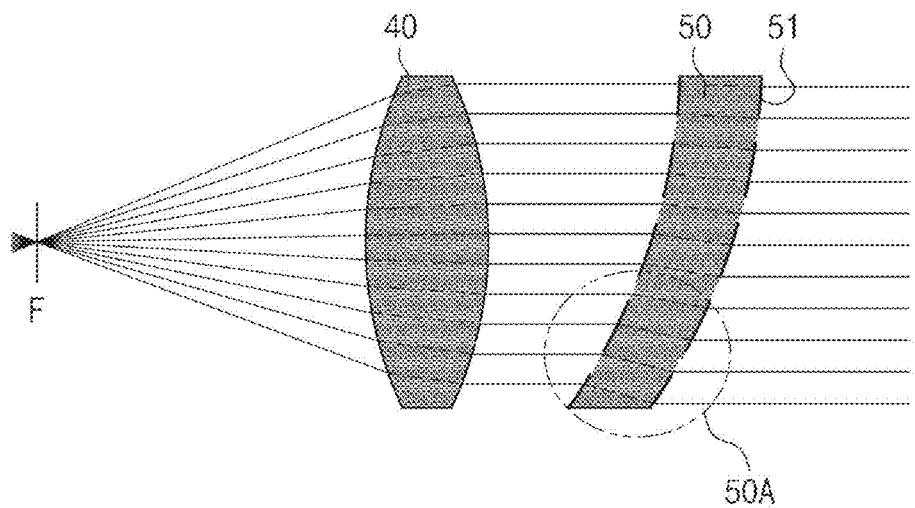
FIG. 3 shows a lens configuration according to the shape of the light-emitting surface of the lens of the lamp for vehicles.
Figure 3:
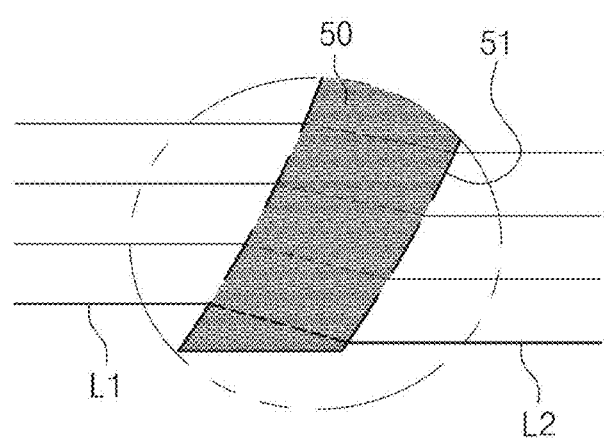

FIG. 3 shows a lens configuration according to the shape of the light-emitting surface of the lens constituting the optical system of the lamp for vehicles.

In FIG. 3, (a) shows an optical system or lamp for vehicles including a lens 50 having a light-emitting surface 51 having the same skin angle as a conventional outer lens.

In FIG. 3, (b) shows an enlarged view of part 50A in (a) of FIG. 3.

To compensate for the changing optical axis, the lens 50 is conventionally designed such that the light-incident surface and the light-emitting surface of the lens 50 have the same skin angle, and the lens 50 is disposed in front of the condensing lens 40. As shown in (b) of FIG. 3, the angle of light L1 incident on the lens 50 and the angle of light L2 emitted from the lens 50 are maintained, whereby there is no change in the optical axis.

The lens 50 does not serve as a condensing lens configured to form light distribution, but is configured to prevent a change of the optical axis. Therefore, as shown, a separate condensing lens 40 that forms light distribution is necessary, and thus two lenses are required.

Figure 4:
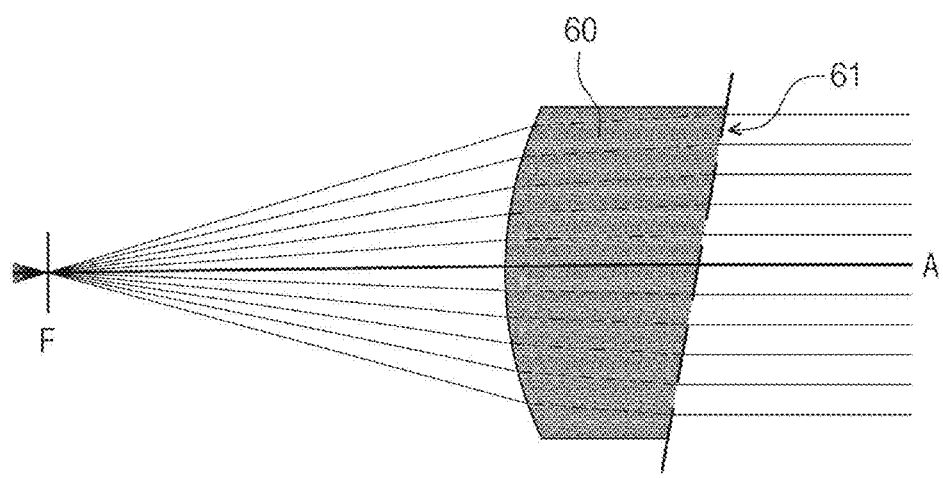
FIG. 4 shows a lens having a light-emitting surface formed with the same skin angle as an outer lens for a lamp according to the present disclosure.

FIG. 4 shows an optical system or lamp for vehicles including a lens having a light-emitting surface formed with the same skin angle as an outer lens for a lamp according to the present disclosure.

The lens 60 according to the present disclosure has a light-emitting surface 61 with a skin angle. Incident light passing through the focus F of the lens 60 is refracted on the light-incident surface of the lens 40 and refracted again on the light-emitting surface of the lens 60 to form light emission parallel to the optical axis A of the optical system.

Therefore, compared to (a) of FIG. 2, the optical axis A is maintained, and accordingly, formation of light distribution according to the refraction of light, etc. may be accomplished as in a conventional optical system design. As a result, the additional lens 50 shown in FIG. 3 is not required, and the light emitted from the light-emitting surface 61 is incident on the outer lens of the lamp, and the light transmitted through the outer lens forms a light distribution.

The light-emitting surface 61 will be described in detail with reference to FIG. 5.

Figure 5:
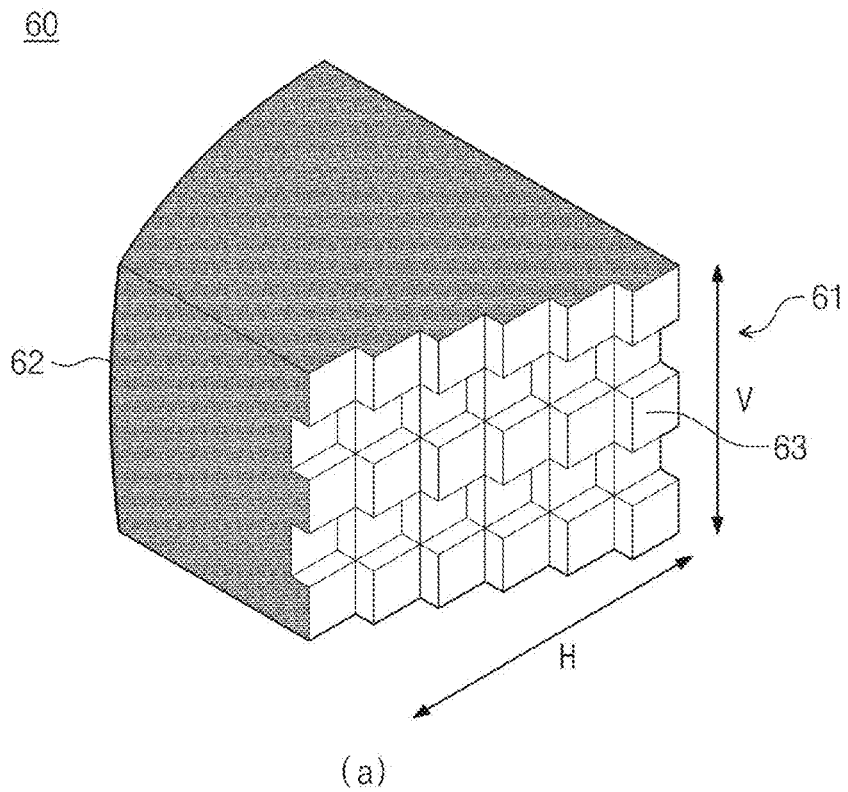
FIG. 5 shows a lens having a plurality of facets formed with the same skin angle as the outer lens for the lamp according to the present disclosure.
Figure 5:
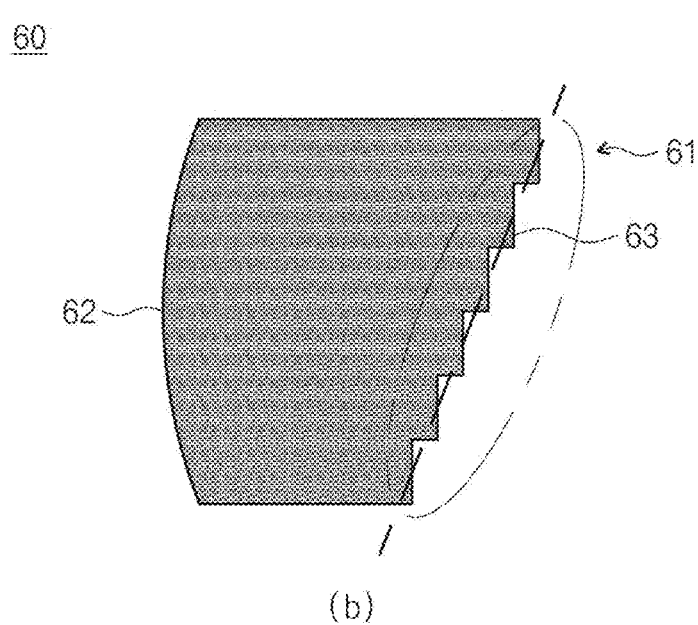

FIG. 5 shows a lens having a plurality of facets formed with the same skin angle as the outer lens for the lamp according to the present disclosure.

The lens 60 includes a plurality of facets, and therefore the lens may be referred to as a multi-faceted lens (MFL).

In FIG. 5, (a) is a perspective view of the lens 60, and (b) is a top view of the lens 60 when viewed from above.

The lens 60 has a light-incident surface 62 and a light-emitting surface 61. The light-emitting surface 61 of the lens 60 includes a plurality of facets 63, which are arranged in a vertical (V) direction (or a longitudinal direction) and a horizontal (H) direction (or a widthwise direction).

Referring to (a) of FIG. 5, the arrangement of the facets 63 may be described as a matrix. The horizontally arranged facets in one row and the horizontally arranged facets in the row thereunder may be slightly different in width or thickness. Alternatively, the horizontally arranged facets in one row and the horizontally arranged facets in the row thereunder may be different by a certain height in light-emitting surface 61. That is, observing the side section of the light-emitting surface 61 of the lens 60, the light-emitting surface may have a repeating uniform pattern of irregularities.

However, this is only an example, and the facet structure may also be formed such that the length from the light-incident surface 62 to the light-emitting surface 61 is the same between neighboring facets in the longitudinal direction, or the light-emitting surface 61 is uniform in the longitudinal direction.

In addition, each facet 63 may be formed to have a curvature. In this case, the curvature of each facet 63 in the horizontal direction may be formed to be the same as (or identical to) the curvature in the vertical direction. Alternatively, the horizontal curvature and the vertical curvature of each facet 63 may be different. Referring to (b) of FIG. 5, it can be seen that the light-emitting surface 61 of the lens 60 is formed to have the same skin angle as the outer lens of the lamp for vehicles. Referring to (b) FIG. 5, it can be seen that the line connecting the centers of the facets 63 forms the overall skin angle of the light-emitting surface of the lens 60.

Figure 6:
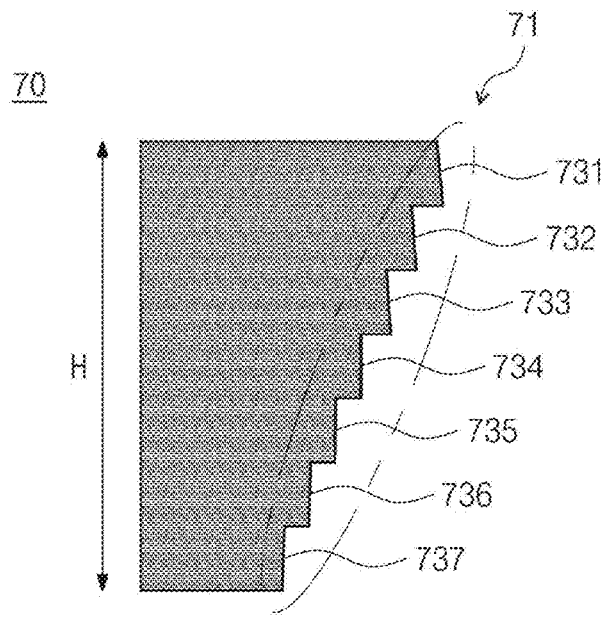
FIG. 6 shows the curvature of a plurality of facets of a lens formed with the same skin angle as the outer lens for the lamp according to the present disclosure.
Figure 6:
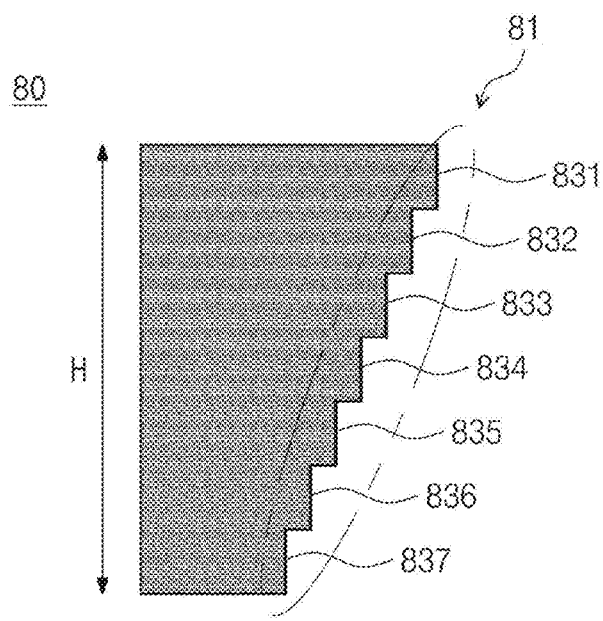

FIG. 6 shows the curvature of a plurality of facets of a lens formed with the same skin angle as the outer lens for the lamp for vehicles according to the present disclosure.

In FIG. 6, (a) shows a lens 70 with a curvature formed on a light-emitting surface of each of facets 731 to 737, and (b) shows a lens 80 with no curvature formed on a light-emitting surface of each of facets 831 to 837.

In FIG. 6, (a) will be described first.

The lens 70 may be designed such that the light-emitting surface 71 of each of the facets 731 to 737 has a curvature. The focus of the light-emitting surface constituted by the plurality of facets 731 to 737 is designed to be located on the optical axis of the optical system including the lens 70. Since each facet has a curvature, light from the light-emitting surface is refracted rather than traveling straight. The angle at which the emitted light is refracted depends on the curvature of the light-emitting surface.

Referring to (a) of FIG. 6, the light-emitting surface 71 of each of the facets 731 to 737 has a curvature. That is, the contour corresponding to the light-emitting surface of each facet is not perpendicular to the optical axis of the optical system. More specifically, in (a) of FIG. 6, it can be seen that the light-emitting surfaces 71 of the facets are formed at different angles (that is, different curvatures), and each facet may have a slope or angle of inclination in which the facet is inclined from the previous facet by a certain angle from the top to the bottom of the figure or the difference in curvature between the facets may be different by a certain curvature.

Alternatively, the angular difference in slope or angle of inclination or the difference in curvature between the facets may not be constant. More specifically, the curvature of each facet may be determined by the number of facets or the skin angle of the light-emitting surface.

This is such that the light-emitting surface 71 constituted by the plurality of facets 731 to 737 corresponds to or is identical to the shape of a light-emitting surface of a convex lens, whereby light transmitted through the lens 70 forms light emission parallel to the optical axis of the optical system without distortion of the optical axis. This will be described in more detail below.

For example, assuming that the angle formed by the contour corresponding to the light-emitting surface of the uppermost first facet 731 in (a) of FIG. 6 is −k1 degrees (i.e., the contour is inclined counterclockwise) relative to the line H in (a) of FIG. 6, the angle formed by the contour corresponding to the light-emitting surface of the second facet 732 adjacent thereto may be −k2 degrees (k2<k1). In addition, the angle formed by the contour corresponding to the light-emitting surface of the third facet 732 adjacent thereto may be −k3 degrees (k3<k2<k1, where k1, k2, and k3 are rational numbers greater than zero), and the angle formed by the contour corresponding to the light-emitting surface of the fourth facet 734 may be 0 degrees. In addition, the angles formed by the contours corresponding to the light-emitting surfaces of the fifth to seventh facets 735, 736, and 737 may be k4 degrees, k5 degrees, and k6 degrees, respectively (k4<k5<k6, where k4, k5, and k6 are rational numbers greater than zero).

In other words, the light-emitting surfaces of the facets disposed side by side in the horizontal direction, among the plurality of facets 731 to 737, may be formed to have horizontal inclination angles or slopes having a predetermined difference in angle. The angle formed by the light-emitting surface of each facet or the contour thereof may be determined by the skin angle of the light-emitting surface 71 of the lens 70 or the skin angle of the outer lens for the lamp including the lens 70. That is, the predetermined difference in inclination angle may be set according to the angle formed by the line connecting the centers of the plurality of horizontally side-by-side arranged facets and the optical axis of the lamp optical system.

In this case, the centrally located facet, among the horizontally arranged facets, may have no inclination angle. That is, the centrally located facet may have a light-emitting surface perpendicular to the optical axis of the optical system.

As another example, the light-emitting surfaces of the facets disposed side by side in the horizontal direction, among the plurality of facets 731 to 737, may be formed to have curvatures having a predetermined difference in curvature. The curvature of each facet may be determined by the skin angle of the light-emitting surface 71 of the lens 70 or the skin angle of the outer lens for the lamp including the lens 70. That is, the predetermined difference in curvature may be set according to the angle formed by the line connecting the centers of the plurality of horizontally side-by-side facets and the optical axis of the lamp optical system.

In addition, although not shown, in the vertical direction, the light-emitting surfaces 71 of the facets may be formed to have different angles (i.e., different curvatures). In other words, the light-emitting surfaces of the facets disposed side by side in the vertical direction, among the plurality of facets, may be formed to have vertical inclination angles or slopes having a predetermined difference in angle. The angle formed by the light-emitting surface of each facet or the contour thereof may be determined by the skin angle of the light-emitting surface 71 of the lens 70 or the skin angle of the outer lens for the lamp including the lens 70. That is, the predetermined difference in inclination angle may be set according to an angle formed by the line connecting the centers of the plurality of vertically side-by-side arranged facets and the optical axis of the lamp optical system.

In this case, the centrally located facet, among the vertically arranged facets, may have no inclination angle. That is, the centrally located facet may have a light-emitting surface perpendicular to the optical axis of the optical system.

As another example, the light-emitting surfaces of the facets disposed side by side in the vertical direction, among the plurality of facets 731 to 737 may be formed to have curvatures having a predetermined difference in curvature. The curvature of each facet may be determined by the skin angle of the light-emitting surface 71 of the lens 70 or the skin angle of the outer lens for the lamp including the lens 70. That is, the predetermined difference in curvature may be set according to the angle formed by the line connecting the centers of the plurality of vertically side-by-side facets and the optical axis of the lamp optical system.

In FIG. 6, (b) will be described.

The light-emitting surfaces 81 of the plurality of facets 831 to 837 of the lens 80 may be designed to have no curvature (i.e., zero curvature). That is, the light-emitting surface of each of the facets 831 to 837 is flat. Because the facets have no curvature, light moves straight toward the light-emitting surface without being refracted.

Referring to the light-emitting surface 61 in (b) of FIG. 5, the line connecting the centers of the plurality of facets eventually forms the skin angle of the lens 60. The line connecting the centers of the plurality of facets may form a straight line or a curved line, depending on the design of the facets, which corresponds to or is identical to the emitting surface of the outer lens for the lamp including the lens 60. The straight or curved line is at least not perpendicular to the optical axis of the optical system constituted by the lens. In addition, the line connecting the centers of the plurality of facets is asymmetrical with respect to the optical axis of the optical system constituted by the lens. Nevertheless, in the lamp or lens according to the present disclosure, the light-emitting surfaces 61, 71, and 81 of the lenses 60, 70, and 80 may be formed by the plurality of facets, whereby light emission coincident or parallel to the optical axis of the lamp optical system may be obtained.

In addition, the centers of the plurality of facets formed on the emitting surface of the lens may form a plane, and the plane corresponds to or is identical to the emitting surface of the outer lens for the lamp including the lens. In addition, the plane is at least not perpendicular to the optical axis of the optical system constituted by the lens. In addition, the plane including the centers of the plurality of facets is asymmetrical with respect to the optical axis of the optical system constituted by the lens. Nevertheless, in the lamp or lens according to the present disclosure, the light-emitting surfaces 61, 71, and 81 of the lenses 60, 70, and 80 may be formed by the plurality of facets, whereby light emission coincident or parallel to the optical axis of the lamp optical system may be obtained.

Figure 7:
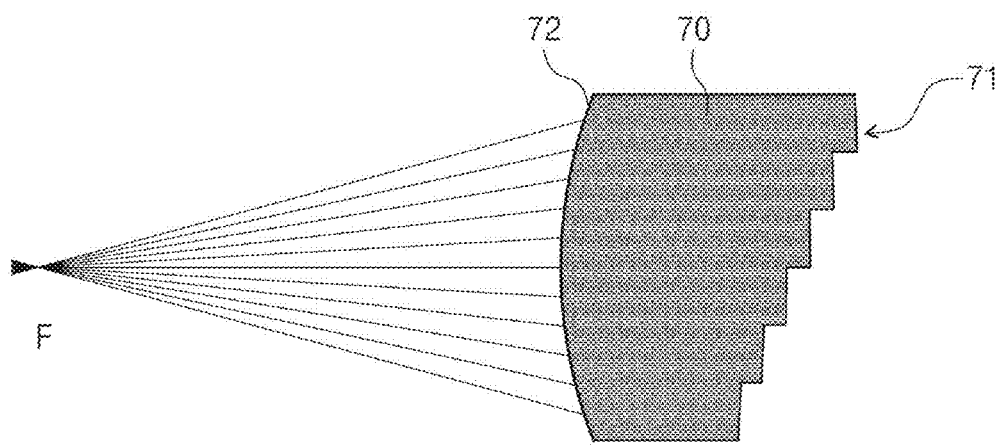
FIG. 7 shows an optical system having a lens formed with the same skin angle as the outer lens for the lamp according to the present disclosure.
Figure 7:
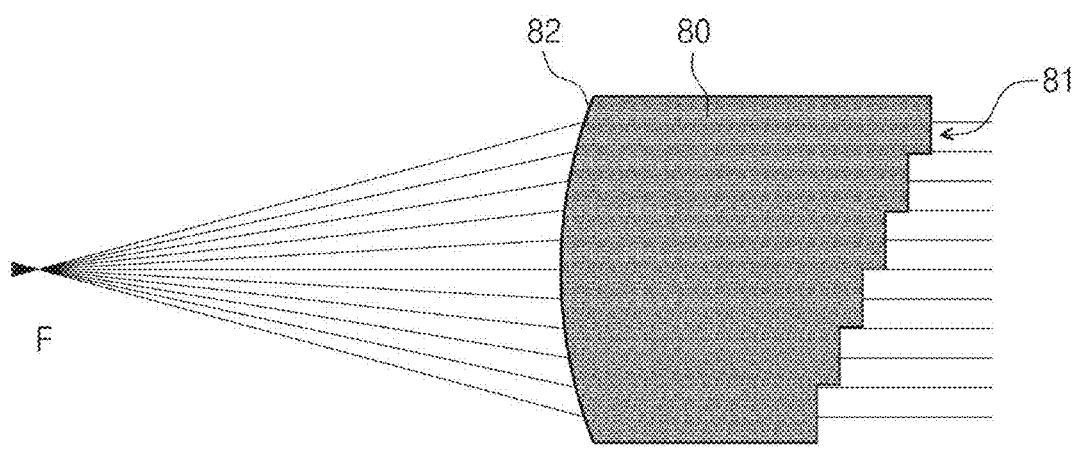

FIG. 7 shows an optical system having a lens formed with the same skin angle as the outer lens for the lamp according to the present disclosure.

Referring to (a) of FIG. 7, a lens 70 having a curvature formed on a light-emitting surface of each facet is shown, and referring to (b) of FIG. 7, a lens 80 having no curvature formed on a light-emitting surface of each facet is shown.

Referring to (a) of FIG. 7, incident light that has passed through the focus F of the lens 70 is refracted on a light-incident surface 72 of the lens 70, is refracted again on a light-emitting surface 71, and is emitted parallel to the optical axis (not shown).

In addition, referring to (b) of FIG. 7, incident light that has passed through the focus F of the lens 80 is refracted on a light-incident surface 82 of the lens 80, is not refracted on a light-emitting surface, and is emitted straight, that is, parallel to the optical axis A of the optical system.

The light-incident surfaces 72 and 82 of the lenses 70 and 80 condense the incident light radiated from the light source 10 and reflected by the reflector 20. This enables formation of light distribution for the lamp.

Meanwhile, the lens 70 is thinner than the lens 80 because a shorter focal length is formed when the curvature is formed at the facet. This is due to a phenomenon of refraction due to curvature.

In addition, although not shown in the drawings, another embodiment of the present disclosure provides a vehicle including the lamp for vehicles including the optical system according to the present disclosure described above.

As is apparent from the above description, the present disclosure has the following effects.

In the present disclosure, a lamp for vehicles is designed such that a light-emitting surface has a plurality of facets using a single lens while the light-emitting surface has a skin angle.

In the present disclosure, an optical system of the lamp for vehicles is configured using a single lens, whereby miniaturization and simplification may be achieved.

The effects of the present disclosure are not limited to those mentioned above, and other unmentioned effects will be clearly understood by a person having ordinary skill in the art to which the present disclosure pertains from the above description.

As described above, the detailed description of the preferred embodiments of the present invention has been provided to enable those skilled in the art to implement and practice the invention.

It will be apparent to those skilled in the art that various modifications and variations can be made in the present disclosure without departing from the spirit or scope of the disclosure.

Thus, it is intended that the present disclosure covers the modifications and variations of this disclosure provided they come within the scope of the appended claims and their equivalents.

What is claimed is:

1. A lamp for vehicles, comprising:
 a light source;
 a reflector configured to reflect light incident from the light source;
 an outer lens; and
 an optical system comprising a lens configured to condense the light reflected from the reflector to form light distribution, the lens having a light-emitting surface and a plurality of facets formed on the light-emitting surface, wherein light emitted from the light-emitting surface is incident on the outer lens,
 wherein a line connecting a plurality of centers of the plurality of facets is straight or curved,
 wherein the line connecting the plurality of centers of the plurality of facets is not perpendicular to an optical axis of the optical system or is asymmetrical with respect to the optical axis,
 wherein the plurality of facets is disposed in an array extending in a horizontal direction and a vertical direction,
 wherein the plurality of facets includes a plurality of first facets disposed side by side in the horizontal direction,
 wherein a plurality of light-emitting surfaces of the plurality of first facets have a plurality of horizontal slopes having a predetermined difference in inclination angle or a plurality of curvatures having a predetermined difference in curvature, and wherein the predetermined difference in inclination angle or the predetermined difference in curvature is set according to an angle formed by a line connecting a plurality of centers of the plurality of first facets and the optical axis of the optical system.

2. The lamp according to claim 1, wherein a plurality of curvatures of the plurality of facets are formed on the light-emitting surface such that a focus of the light-emitting surface is located on the optical axis of the optical system.

3. The lamp according to claim 1, wherein each of the plurality of facets is formed such that a first curvature in the vertical direction and a second curvature in the horizontal direction are identical.

4. The lamp according to claim 1, wherein a curvature of each of the plurality of facets is zero.

5. The lamp according to claim 1, wherein the lens further has a light-incident surface configured to condense the light reflected from the reflector.

6. The lamp according to claim 1, wherein a skin angle of the light-emitting surface of the lens identical to that of the outer lens.

7. A lamp for vehicles, comprising:
a light source;
a reflector configured to reflect light incident from the light source;
an outer lens; and
an optical system comprising a lens configured to condense the light reflected from the reflector to form light distribution, the lens having a light-emitting surface and a plurality of facets formed on the light-emitting surface, wherein light emitted from the light-emitting surface is incident on the outer lens,
wherein a line connecting a plurality of centers of the plurality of facets is straight or curved,
wherein the line connecting the plurality of centers of the plurality of facets is not perpendicular to an optical axis of the optical system or is asymmetrical with respect to the optical axis,
wherein the plurality of facets is disposed in an array extending in a horizontal direction and a vertical direction,
wherein the plurality of facets includes a plurality of first facets disposed side by side in the vertical direction,
wherein a plurality of light-emitting surfaces of the plurality of first facets have a plurality of vertical slopes having a predetermined difference in inclination angle or a plurality of curvatures having a predetermined difference in curvature, and
wherein the predetermined difference in inclination angle or the predetermined difference in curvature is set according to an angle formed by the line connecting a plurality of centers of the plurality of first facets and the optical axis of the optical system.

8. A vehicle comprising:
a light source;
a reflector configured to reflect light incident from the light source;
an outer lens; and
an optical system comprising a lamp comprising a lens configured to condense the light reflected from the reflector to form a light distribution, the lens having a light-emitting surface and a plurality of facets formed on the light-emitting surface, wherein light emitted from the light-emitting surface is incident on the outer lens,
wherein a line connecting a plurality of centers of the plurality of facets is straight or curved,
wherein the line connecting the plurality of centers of the plurality of facets is not perpendicular to an optical axis of the optical system or is asymmetrical with respect to the optical axis,
wherein the plurality of facets is disposed in an array extending in a horizontal direction and a vertical direction,
wherein the plurality of facets includes a plurality of first facets disposed side by side in the horizontal direction,
wherein a plurality of light-emitting surfaces of the plurality of first facets have a plurality of horizontal slopes having a predetermined difference in inclination angle or a plurality of curvatures having a predetermined difference in curvature, and
wherein the predetermined difference in inclination angle or the predetermined difference in curvature is set according to an angle formed by a line connecting a plurality of centers of the plurality of first facets and the optical axis of the optical system.

* * * * *